(12) United States Patent
Fallon (10) Patent No.: US 8,443,964 B2
(45) Date of Patent: May 21, 2013

(54) ADJUSTABLE RESERVOIR FOR ROD-LIKE ARTICLES

(75) Inventor: Gary Fallon, London (GB)

(73) Assignee: International Tobacco Machinery Poland SP. Z O.O., Radom (PL)

( * ) Notice: Subject to any disclaimer, the term of this patent is extended or adjusted under 35 U.S.C. 154(b) by 319 days.

(21) Appl. No.: 12/521,708

(22) PCT Filed: Dec. 17, 2007

(86) PCT No.: PCT/GB2007/004826
§ 371 (c)(1),
(2), (4) Date: Sep. 20, 2011

(87) PCT Pub. No.: WO2008/081160
PCT Pub. Date: Jul. 10, 2008

(65) Prior Publication Data
US 2011/0315513 A1 Dec. 29, 2011

(30) Foreign Application Priority Data
Jan. 3, 2007 (GB) .................................. 0700075.5

(51) Int. Cl.
*B65G 21/10* (2006.01)
*B65G 21/16* (2006.01)

(52) U.S. Cl.
USPC ........ 198/603; 198/347.1; 198/586; 198/594; 198/604; 198/606; 198/626.1; 198/778

(58) Field of Classification Search
USPC ................... 198/347.1, 347.2, 586, 594, 602, 198/603, 604, 606, 607, 626.1, 778
See application file for complete search history.

(56) References Cited

U.S. PATENT DOCUMENTS

| 4,078,648 A | | 3/1978 | Hinchcliffe | |
| 4,392,767 A | * | 7/1983 | Ischebeck | ...................... 209/559 |
| 5,413,213 A | * | 5/1995 | Golz et al. | ...................... 198/778 |

(Continued)

FOREIGN PATENT DOCUMENTS

| DE | 102004063256 A1 | 7/2006 |
| EP | 1344462 A2 | 9/2003 |

OTHER PUBLICATIONS

International Search Report and Written Opinion corresponding to PCT/IB2007/004722 mailed May 7, 2010.

(Continued)

*Primary Examiner* — Leslie A Nicholson, III
(74) *Attorney, Agent, or Firm* — Oppedahl Patent Law Firm LLC (57) ABSTRACT

An adjustable reservoir for articles such as smoking articles and smoking article filters comprises a plurality of conveyors mounted one above another in a vertical stack, each conveyor comprising an endless belt defining a curved conveying path of constant radius extending between two ends proximally spaced to define a gap through which articles carried by the belt may drop, and a drive mechanism operable to rotate at least one conveyor about the vertical axis of the stack so as to change the angular position of the gap of that conveyor relative to the gaps of adjacent conveyors. Changing the relative angular positions of the gaps allows the capacity of the reservoir to be adjusted, and further adjustment can be achieved by changing the direction of travel of the conveyor belts. The drive mechanism can be configured to move one or more groups of conveyors in unison, or to move each conveyor individually.

17 Claims, 6 Drawing Sheets

U.S. PATENT DOCUMENTS

| | | | |
|---|---|---|---|
| 5,833,046 A * | 11/1998 | Smith et al. | 198/458 |
| 6,016,904 A * | 1/2000 | Hammock et al. | 198/812 |
| 6,725,998 B2 * | 4/2004 | Steeber et al. | 198/347.4 |
| 2003/0000811 A1 | 1/2003 | Biondi | |

OTHER PUBLICATIONS

International Preliminary Report on Patentability corresponding to PCT/IB2007/004722 issued May 11, 2010.

* cited by examiner

ADJUSTABLE RESERVOIR FOR ROD-LIKE ARTICLES

CLAIM FOR PRIORITY

This application is a National Stage Entry entitled to and hereby claims priority under 35 U.S.C. §§365 and 371 corresponding to PCT Application No. PCT/GB2007/004826, titled, "Adjustable Reservoir for Rod-Like Articles," filed Dec. 17, 2007, which in turn claims priority to British Application Serial No. GB 0700075.5, filed Jan. 3, 2007, all of which are hereby incorporated by reference.

BACKGROUND OF THE INVENTION

The present invention relates to an adjustable reservoir for rod-like articles, such as smoking articles and filter rods for smoking articles.

It is common to use one or more reservoirs on a production line that fabricates smoking articles such as cigarettes, to absorb a temporary excess and make up a temporary deficit in the quantity of units produced if the speed of part of the production machinery varies with respect to that of adjacent units. For example, if a particular machine breaks down or has to be stopped, it is necessary to temporarily store units produced by the upstream machine until the machine in question is operational again and can process the stored units. Similarly, if the upstream machine goes out of service, units stored in a reservoir can be processed by the downstream machine until the upstream machine is able to supply units again. The reservoir acts as a storage buffer between the machines. Reservoirs may be employed between a machine that makes filter rods and a machine that assembles cigarettes from filter rods and tobacco rods to store the filter rods, or between the cigarette maker and a packing machine to store the cigarettes, for example.

Usefully, reservoirs have a variable capacity to accommodate changes in the volume flow of units along the production line. Such reservoirs may comprise an arrangement of one or more conveyors that form a variable length conveying path between adjacent machines The path is made long if the upstream machine is producing more units that the downstream machine can process, to accommodate more units, and shortened if both machines are operating at the same speed to minimise the path between the machines and hence minimise production time. Reservoirs that provide a path between machines are known as first-in, first-out (FIFO) reservoirs, because the first unit delivered into the reservoir from the upstream machine is also the first unit output by the reservoir to the downstream machine.

Alternatively, a reservoir may be a last-in, first-out (LIFO) reservoir, in which the most recently stored units are delivered first to the downstream machine. This may be achieved by a conveyor that branches off from the production line, and runs in a forward direction to take units from the line and in a reverse direction to deliver units back to the line.

A problem with LIFO reservoirs is that the units delivered into the reservoir first may stay in the reservoir for an extended period before being processed further, since the more recently delivered units are processed first. The time for which each unit stays on the production line depends on its location in the reservoir, and the order in which units are processed by the downstream machine is different from the order in which units are produced from the upstream machine. This makes it very difficult to track individual units. However, the requirement for product tracking and traceability is becoming more widespread in many production industries, including the tobacco industry. Use of LIFO reservoirs is incompatible with this.

A further issue with LIFO reservoirs relates to the freshness of the product, if the reservoir is not exhausted regularly. For long production runs in the tobacco industry, units could be up to two weeks old before they leave the reservoir, which is undesirable for cigarettes and the like.

Consequently, FIFO reservoirs are becoming the preferred option. However, commonly used FIFO reservoirs such as those described in EP 1,344,463, EP 1,445,218, WO 02/085144 and WO 2004/085293 typically occupy a very large area. These devices comprise an input, an output and a single endless conveyor divided into an active branch extending from the input to the output that acts as the reservoir, and a return branch from the output to the input, where the capacity of the reservoir is altered by varying the lengths of the two branches in a complementary manner, such as by moving a drum around which the conveyor is wound. The large footprint of these FIFO reservoirs frequently means that they can only be incorporated into an established production system by mounting them above the production machinery. This requires a very large ceiling height, typically in excess of 7 meters, which is often not available in existing factories.

US 2003/0000811 describes an alternative FIFO reservoir that is intended for use with cigarette packets. The reservoir comprises a stack of circular conveyors that each rotate in the same direction and which are connected in series by linking means joining each conveyor to the one below to give a continuous path from an input at the top of the stack to an output at the bottom. The capacity is adjusted by varying the speed of the individual conveyors to change the spacing between packets as they are delivered to a conveyor.

SUMMARY OF THE INVENTION

The present invention is directed to an adjustable reservoir for rod-like articles comprising: at least two conveyors mounted one above another in a vertical stack, each conveyor comprising an endless belt defining a substantially horizontal curved conveying path of substantially constant radius extending between two ends proximally spaced to define a gap through which articles carried by the belt may drop, the radius of each conveyor being substantially equal; and a drive mechanism operable to rotate at least one conveyor about the vertical axis of the stack so as to change the angular position of the gap of that conveyor relative to the gaps of adjacent conveyors.

This arrangement of conveyors gives a reservoir that can have a large capacity with a small footprint, so can be readily accommodated adjacent to already installed machinery in an established production line. Articles delivered to the top of the reservoir are conveyed down through the conveyor stack by being carried to the gap in each conveyor by travel of the endless belt and then falling through the gap to the conveyor below, until they reach the bottom of the stack where they can exit the reservoir. Thus, a first-in, first-out (FIFO) reservoir is provided, suitable for meeting current demands regarding product traceability. Relative rotation of the various conveyors to reposition the gaps alters the total path through the conveyor to give a very simple and quick way of varying the reservoir capacity to any value between a maximum and minimum. Further, the design is readily adaptable to achieve desired maximum and minimum values for the capacity by selecting the conveyor radius and the number of conveyors in the stack.

The drive mechanism may comprise a single driver unit connected to alternate conveyors in the stack and operable to rotate those conveyors in unison. This gives the adjustability in reservoir capacity arising from repositioning the conveyor gaps with a minimum of components and low system complexity.

Alternatively, the drive mechanism may comprise a first driver unit connected to alternate conveyors in the stack and operable to rotate those conveyors in unison, and a second driver unit connected to the remaining conveyors in the stack and operable to rotate those conveyors in unison. Slightly more complex than the previous embodiment, this arrangement allows the capacity to be adjusted more rapidly, and also permits adjustment in the event of malfunction of one of the driver units, so that processing of the articles need not be stopped in such an event. As an example, the first driver unit may be operable to rotate its conveyors in a first direction, and the second driver unit may be operable to rotate its conveyors in a second direction opposite to the first direction.

In a further alternative, the drive mechanism may comprise a driver unit for each conveyor, each driver unit connected to its conveyor and operable to rotate that conveyor independently of the other conveyors in the stack. These driver units may be operable to rotate alternate conveyors in the stack in opposite directions. Although the provision of individual driver units for each conveyor is more costly and complex, it offers extreme flexibility in capacity adjustment, and greatly reduces the risk of production down-time if driver unit failure occurs.

In some embodiments, the belts of alternate conveyors in the stack travel in opposite directions. In alternative embodiments, the belts of all the conveyors in the stack travel in the same direction. Either arrangement allows flexible adjustment of the reservoir capacity, but the belt travel direction needs to be taken into account when rotating the conveyors to alter the path through the reservoir. For further flexibility, the direction of travel of the belt of each conveyor may be switched between two opposite directions.

The belt of at least one conveyor may be kept static while the belts of the other conveyors are travelling. For example, an intermediate conveyor in the stack can be switched off to divide the reservoir into two parts. This can be used to provide a clear zone between the end of one product run and the start of the next product run so that articles of the two runs do not become mixed up.

The adjustable reservoir may further comprise at least one rejection device operable to remove defective articles from at least one conveyor. Such rejection devices can be arranged to remove articles from a conveyor that has been halted, or from a moving conveyor; the latter is most efficient.

Also, the adjustable reservoir may further comprise a delivery conveyor arranged to deliver articles onto a conveyor in the stack, and a collection conveyor arranged to collect articles from a conveyor lower in the stack than the said conveyor.

For example, the delivery conveyor may deliver articles to the top conveyor, and the collection conveyor may collect articles from the bottom conveyor. In such an embodiment, the top conveyor and the bottom conveyor may be not rotatable about the vertical axis of the stack. This avoids any requirement to move the delivery conveyor and the collection conveyor to maintain alignment with movable top and bottom conveyors.

Furthermore, at least one of the delivery conveyor and the collection conveyor may be vertically repositionable to communicate with different conveyors, whereby the number of conveyors between the delivery conveyor and the collection conveyor may be varied. This offers a further way in which the capacity of the reservoir can be adjusted, since the number of conveyors that are available to contribute to the total path length can be altered.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1A:
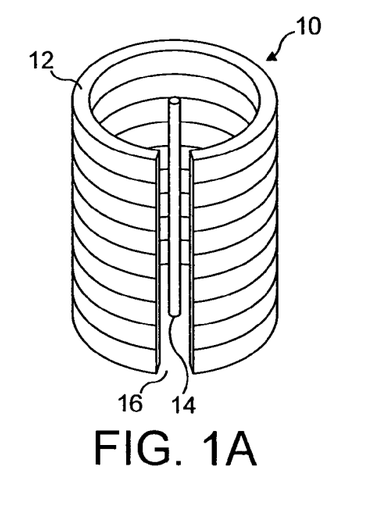
FIGS. 1A and 1B shows simplified perspective views of a reservoir according to an embodiment of the invention, in different positions.
Figure 1B:
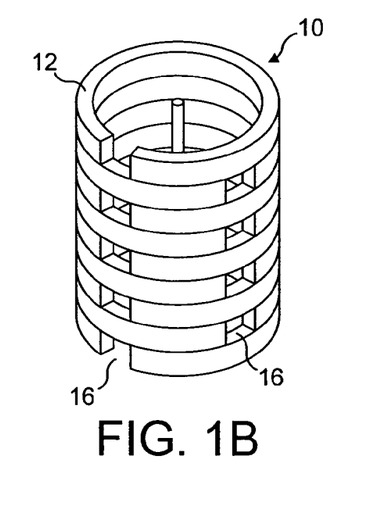

FIGS. 1A and 1B show schematic simplified perspective views of an adjustable reservoir according to an embodiment of the invention. The reservoir 10 comprises a plurality, in this example nine, of conveyors 12 arranged in a vertical stack about a vertical axis 14. Each conveyor 12 is portrayed as a block for ease of illustration, but comprises an endless driveable belt rotatable about a pair of rollers so that the belt travels and transports items upon it in the usual manner, where the belt and rollers are arranged such that the conveyor defines a horizontal curved path of a constant radius that extends between two ends that are spaced apart from each other to form a gap 16. In other words, the conveyor path is substantially circular but for a small arc that is absent owing to the gap.

The conveyors 12 are stacked one above the other with the centre points of each of the circular paths aligned on the vertical axis 14. The radius of each conveyor 12 is substantially equal to the radii of the other conveyors 12 in the stack.

Each conveyor 12 has two types of movement associated with it. Firstly, the belt of each conveyor 12 rotates about its rollers as described above, for the purposes of conveying items along the conveyor. In various examples, the belt may travel in one direction or the opposite direction only, or may be switchable between the two directions. Secondly, the whole conveyor 12 (belt and rollers, etc.) can be rotated about the vertical axis 14 so as to change the position of the gap about the circumference of the circular path. At least some of the conveyors 12 can be rotated independently of their adjacent conveyors so that the relative circumferential positions of the gaps of adjacent conveyors can be varied. FIG. 1A shows the reservoir 10 in a configuration in which the gaps 16 of all the conveyors 12 are aligned vertically. FIG. 1B shows the reservoir 10 in a configuration in which alternate conveyors 12 have been rotated in opposite directions about the vertical axis 14, so that the gaps 16 are displaced from one another.

In operation, articles such as cigarettes or filter rods for cigarettes are delivered to an upper conveyor in the stack (probably the top conveyor) and conveyed by the travelling belt to the gap, whereupon the articles fall through the gap to the conveyor below. This in turns conveys the articles towards its gap, via travel of the belt, and so on until the articles reach the bottom of the stack where they are removed for delivery to a downstream machine. The total path length through the stack from the delivery point to the exit point is the sum of the distances between the place where the articles arrive on a conveyor and the gap in that conveyor, for all conveyors. This distance is defined by the separation between the gap in the conveyor and the gap in the conveyor above, and the direction of travel of the belt, both of which may be altered. The total path length determines the capacity of the reservoir, and hence the capacity is variable. In fact, assuming that all conveyors can be turned to any angular position, the capacity is infinitely variable between a maximum and a minimum value. The number of conveyors in the stack and the length of the individual conveyors can be selected to give a desired maximum capacity.

Figure 2:
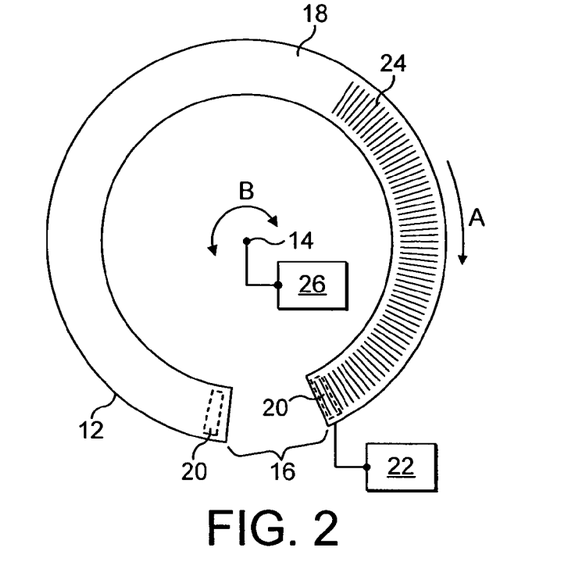
FIG. 2 shows a plan view of a curved conveyor such as can be used in a reservoir according to embodiments of the invention.

FIG. 2 shows a plan view of a single conveyor 12. The conveyor 12 comprises an endless belt 18 rotatable about a pair of rollers 20 positioned at the ends of the conveyor 12. The spacing between the rollers 20 defines the gap 16 in the conveyor 12. A belt driver unit 22 is coupled to one of the rollers 20 to drive rotation of the belt 18. In this example, the belt 18 is driven so that its upper surface moves in a clockwise direction, shown by arrow A. The travelling surface of the belt 18 can thus convey articles 24 in a clockwise direction along the conveyor 12 to the gap 16. Upon reaching the gap 16, the articles 24 fall through. In other examples the belt 18 may be driven in an anticlockwise direction, or the belt driver unit 22 may be operable to drive the belt 18 in either direction.

The conveyor 12 has an associated conveyor driver unit 26 which is operable to rotate the conveyor 12 in the horizontal plane (plane of the page) about the vertical axis of the stack 14. Thus, the gap 16 may be circumferentially repositioned relative to the gaps in the conveyors above and below the conveyor 12, to alter the capacity of the reservoir 10. In this example, the conveyor may be rotated in either direction, as shown by the arrow B. In other examples, the conveyor may be rotatable in only one or the other direction.

Figure 3A:
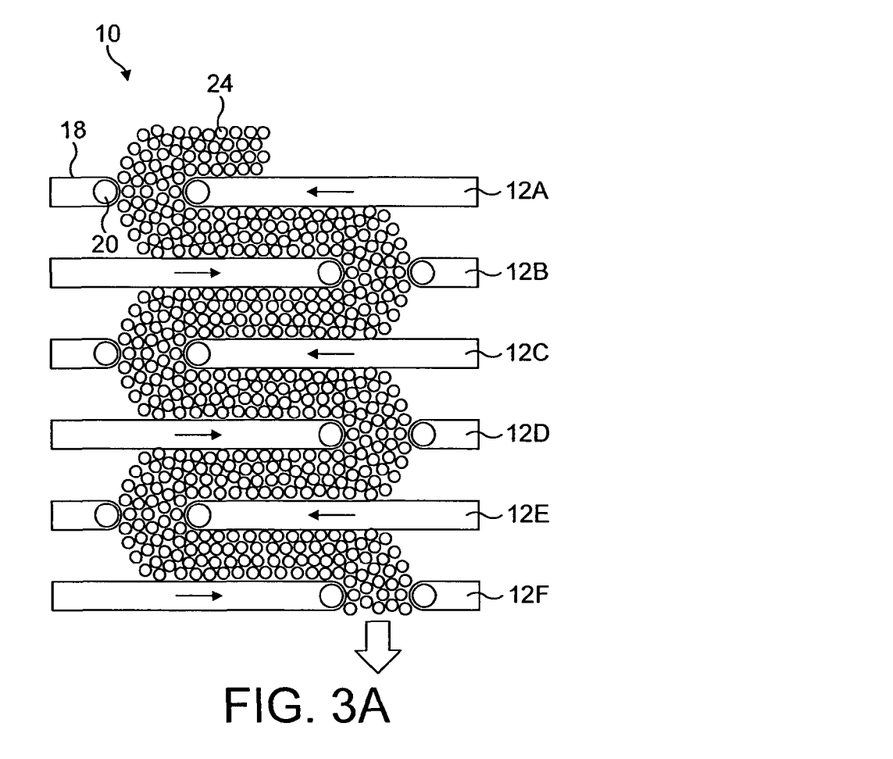
FIG. 3A shows a side view of a reservoir according to an embodiment of the invention in operation.

FIG. 3A shows a side view of a reservoir 10 according to an embodiment of the invention, in operation. In this example, the reservoir 10 comprises six conveyors 12, each comprising an endless belt 18 driven around rollers 20. The gaps 16 are circumferentially offset from the gaps in the adjacent conveyors 12, and the belts 18 of alternate conveyors 12 are driven in opposite directions, as indicated by the arrows in the Figure. Articles 24 are delivered to the topmost conveyor 12A in a mass, and are carried clockwise (left in the Figure) by the travelling belt 18 to the gap, where they fall through the conveyor below, 12B. The belt 18 of this conveyor 12B is moving anticlockwise, and carries the articles 24 towards the gap in this conveyor 12B, where they fall through onto the next conveyor 12C. This continues down through the stack until the articles fall through the gap 16 in the bottom conveyor 12F, where they exit the reservoir. Hence, as can be seen from the Figure, the articles 24 follow a serpentine path down the stack from one conveyor to the next. If any of the conveyors is rotated about the vertical axis of the stack, the position of its gap relative to the gaps immediately above and below is altered, thereby changing the path length through the reservoir, and increasing or decreasing the total capacity. Also, if the direction of travel of any of the conveyors is reversed, the path length also changes, because the articles then have to travel around the complementary part of the circular path of that conveyor to reach the gap than they did before.

To minimise damage to the articles as they fall from one conveyor to the next, the vertical spacing between the conveyors may be made relatively small. The articles may be conveyed through the reservoir in sequence. Alternatively, if the spacing is appropriate and the total volume of articles is large enough, the conveyor can be configured such that the articles completely fill the spaces between the conveyors in the vertical direction, as shown in FIG. 3A. This gives a slow mass flow for each individual article within the whole mass, which further reduces the risk of any individual article being damaged during its passage through the reservoir. For articles with dimensions similar to those of cigarettes and filters, a useful spacing between reservoirs has been found to be about 180 mm. Other spacings are not precluded, however. Using a spacing of this order, a reservoir with a useful capacity for a typical cigarette manufacturing line can be provided by a stack of about 2 meters high and with a footprint of only around 4 to 6 m$^2$, which may be more readily accommodated than the large footprint conventional FIFO reservoirs.

Figure 3B:
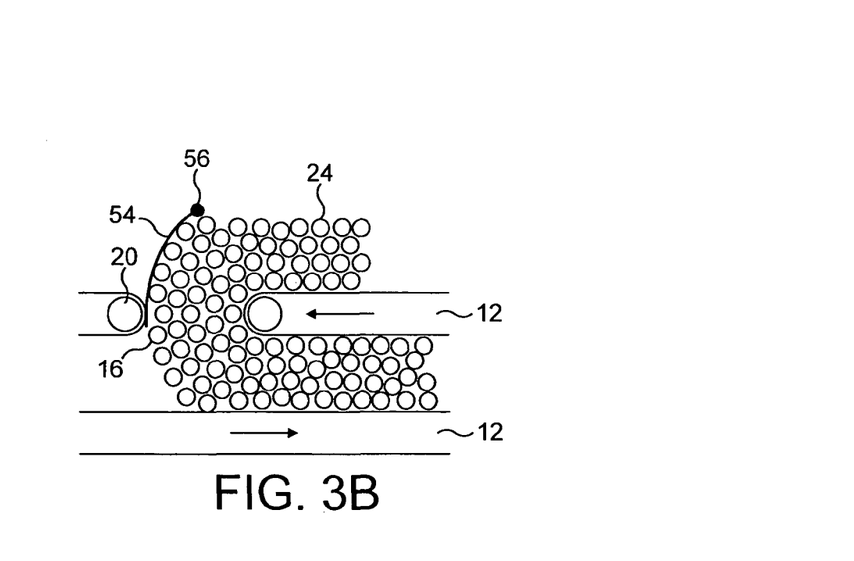
FIG. 3B shows a side view of part of a reservoir having a feature according to a further embodiment.

FIG. 3B shows a side view of part of a reservoir, having a feature according to a further embodiment that facilitates the flow of articles through the reservoir. In this example, each conveyer 12 is provided with a cowl 54. The cowl 54 is a curved (or flat) plate positioned in the path of the articles 24 and largely orthogonal to the direction of flow of articles 24 on that conveyor, and on the downstream side of the gap 16. Hence, the stream of articles 24 carried by the conveyor 12 runs into the cowl 54 so that the articles are directed downwards through the gap 16. This provides control of the article flow through the gap 16, and also stops the articles 24 from passing over the gap 16 and travelling more than once around the conveyor (which would make the reservoir not a FIFO reservoir). The cowl 24 is coupled in position relative to the conveyor 12 so that it moves around with the conveyor 12 when the conveyor 12 is rotated about the vertical axis of the stack. This may be accomplished by mounting the cowl 54 onto one or both of the rollers 20, for example. The cowl 54 may be fixed, or alternatively may be able to swing or pivot about an upper point 56. A fixed arrangement is simpler, but pivoting allows a more controlled drop of the articles through the gap (thus reducing article damage). Also, pivoting can make initial feeding of the reservoir and final unloading easier as it reduces the chance of individual articles twisting as they fall.

It will be evident from the foregoing description that reservoirs according to the present invention are extremely flexible as regards the variability of the capacity. One of the features that controls the capacity is the relative rotation of the conveyors and hence the rotation of each individual conveyor. This can be implemented in a number of ways.

Figure 4:
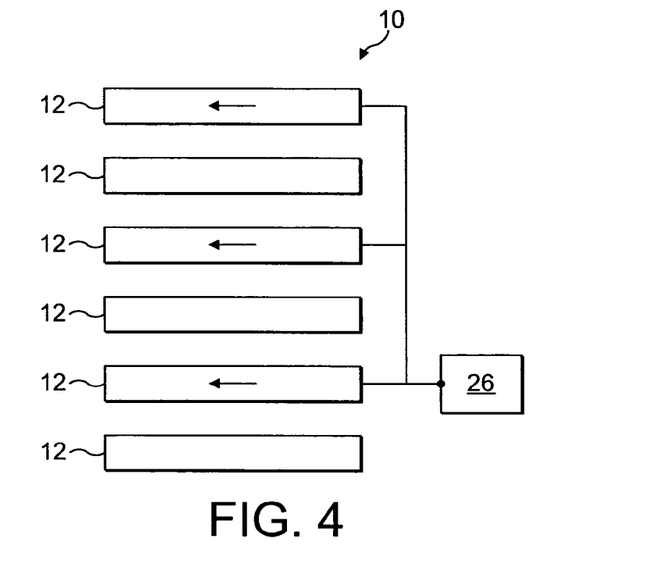
FIGS. 4, 5 and 6 show simplified side views of reservoirs according to embodiments of the invention, having different configurations of conveyor drive mechanism.

FIG. 4 shows a simplified side view of a reservoir 10 comprising a stack of six conveyors 12 (shown schematically as blocks for ease of illustration) and a drive mechanism 26 according to a first embodiment. The drive mechanism 26 comprises a single driver unit 26 connected to the first, third and fifth conveyors only, and operable to rotate these conveyors in a clockwise direction about the vertical axis of the stack (as seen from above the stack). This is shown by the arrows in the Figure (in contrast with the arrows in FIG. 3A, which show the direction of travel of the belts). These three conveyors are moved by the driver unit 26 simultaneously and at the same speed, so that they are rotated in unison. The second, fourth and sixth conveyors have no drive unit and are hence static with respect to the vertical axis of the stack. Rotation of the first, third and fifth conveyors relative to the static conveyors is sufficient to achieve the required variation of the reservoir capacity however, and the use of a single driver unit 26 to accomplish this is a simple and low cost implementation. Note that the same result is achievable by rotating the odd-numbered conveyors anticlockwise instead, or by having these conveyors static and rotating the even-numbered conveyors in either the clockwise or the anticlockwise direction. Or, for either arrangement, the drive unit 26 may be configured to rotate the movable conveyors in either direction.

Figure 5:
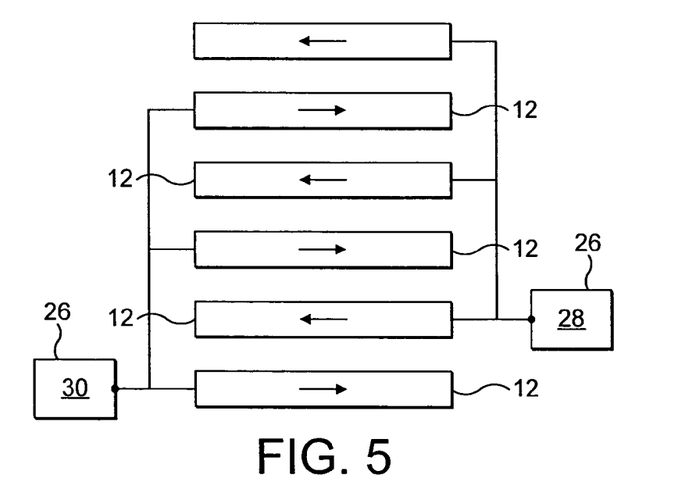

FIG. 5 shows a simplified side view of a reservoir 10 comprising a stack of six conveyors 12 and a drive mechanism 26 according to a second embodiment. In this embodiment, the drive mechanism 26 comprises two separate driver units. A first driver unit 28 is connected to the first, third and fifth conveyors so as to rotate them clockwise in unison, as in FIG. 4. In addition, a second driver unit 30 is connected to the second, fourth and sixth conveyors and is operable to rotate them anticlockwise in unison. The overall effect of this more complex configuration is the same as that achieved in the embodiment of FIG. 4, but has the advantage that the capacity can be altered in half the time of FIG. 4, because the two sets of conveyors have each to move over only half the distance, and can do so simultaneously. Further, the reservoir is still adjustable in the event that one of the driver units 28, 30 fails. Once again, each of the driver units can be operable to rotate its associated conveyors in one or both directions, and each driver unit may operate separately from the other, and/or simultaneously.

Figure 6:
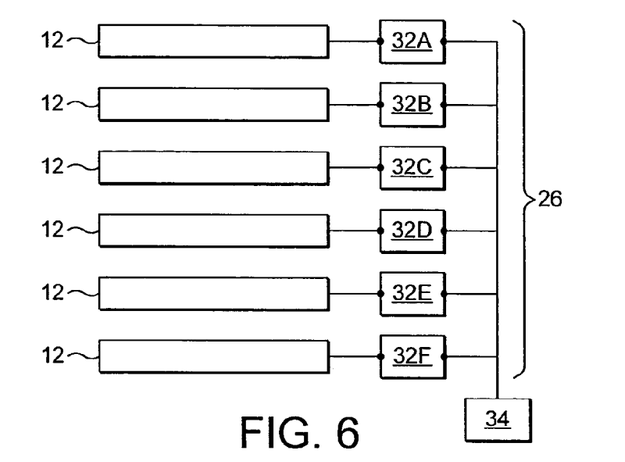

FIG. 6 shows a simplified side view of a reservoir 10 comprising a stack of six conveyors 12 and a drive mechanism 26 according to a third embodiment. In this example, the drive mechanism 26 comprises a plurality of separate driver units, 32A-32F, each connected to an individual conveyor 12. The driver units 32A-32F may be operable to rotate alternate conveyors 12 in opposite directions (either in unison or separately), to achieve the effect shown in FIG. 5. For maximum flexibility, however, each driver unit 32A-32F is independent and can rotate its conveyor 12 in either direction, by any distance and simultaneously or separately with the other driver units 32A-32F. Variable speeds of rotation can be provided as well, if desired. This allows a large movement for one conveyor to be implemented in a similar time to a smaller movement for another conveyor, for example. The use of many separate driver units allows each conveyor to moved entirely independently of the others, and also still offers a high level of flexibility if one or even more than one driver unit should fail or malfunction. For ease of use of such an arrangement, all the driver units 32A-32F may be connected to a central control unit 34, such as a microprocessor, which can send individual commands to each of the driver units 32A-32F. The control unit 34 may be configured to receive information from other parts of the production line of which the reservoir forms a part, so that the capacity of the reservoir can be automatically adjusted in response to the performance of the upstream and downstream machines. Control units may also be used with the drive mechanisms of FIGS. 4 and 5. Also, a combination of individual and shared driver units could be used.

Further factors that control the reservoir capacity are the direction and speed of travel of each of the conveyor belts. The belts may all be driven at the same speed, preferably with alternate belts travelling in opposite directions. However, greater flexibility is achieved if each belt is driven wholly independently, with regard to speed and direction, and operation or non-operation. Each conveyor may be provided with its own belt driver unit if it is desired to control each belt separately in this way, whereas for belts that are always to be driven simultaneously at the same speed and in the same direction, a shared driver unit can be used. A control unit can be provided to send control signals to the or each belt driver unit; this may or may not be a control unit 34 that controls the conveyor driver units (see FIG. 6).

Although the driver units for the belts and for the conveyors have been described up to now as being separate components, in other embodiments, these units may be combined. For example, a clutch and gear box arrangement may be used in conjunction with a single motor to drive both the belt of a conveyor and rotation of that conveyor. Further, more complex clutch and gear box arrangements may be combined with one motor to drive the belts and the rotation of more than one conveyor.

A further advantage of having at least one of the conveyors driven wholly independently of the other comes into effect when production of the articles is changed from one product run to the next. A defined break is needed between the articles of the two products. Using an embodiment of the present invention, this can be achieved by switching off the belt(s) of one or more conveyors in the central part of the stack. This can be done either when the last of the articles of the first product run have travelled past that point in the reservoir, or when the total number of required such articles have travelled past that point, in which case any additional articles after the last one required can be removed from the higher conveyors. The halted conveyor belts in the centre of the stack effectively divide the reservoir into two smaller reservoirs, with the final articles of the first product run being emptied from the bottom of the stack, while at the same time the first articles of the second run can be delivered to the top of the stack, with no risk that the two products runs merging together because of the static belt or belts dividing them. Once the last article from the first product run has left the reservoir, the halted belts can be switched on again, to move the new articles from the second product run down into the lower parts of the reservoir for supply to the downstream machine. This is beneficial compared to a conventional reservoir, which typically requires all articles of the first product run to be run out of the reservoir before any of the articles of the second product run can enter the reservoir. Hence, production time can be saved using embodiments of the present invention.

Embodiments of the invention are also of particular use if it is desired to reduce the reservoir capacity as much as possible, for example for very short product runs (such as for samples of a new product), or if the upstream machine has been out of operation and it is necessary to deliver its output as quickly as possible to the downstream machine. A small capacity can be achieved by rotating the conveyors until each gap is circumferentially spaced from that in the conveyor below by a negligible amount (having regard to the direction of travel of the belts). This gives a minimum total path through the reservoir without subjecting the articles to the large drop that would result if all the gaps where aligned directly one above the other.

Figure 7A:
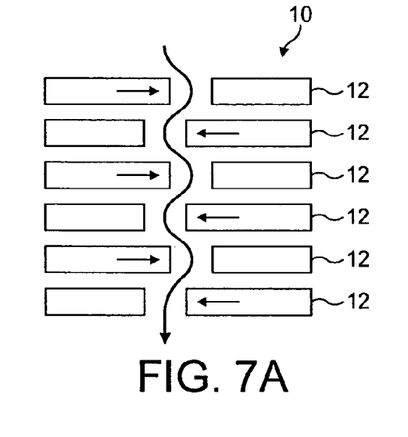
FIGS. 7A and 7B show simplified side views of reservoirs according to embodiments of the invention, in two configurations giving a minimum reservoir capacity.
Figure 7B:
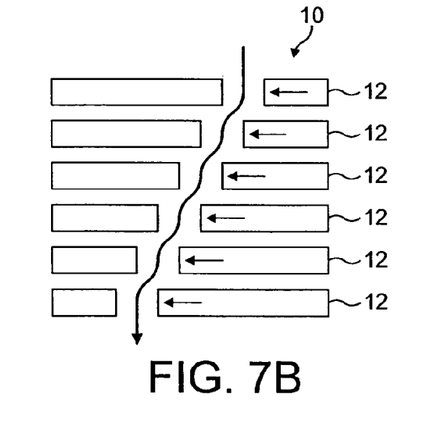

FIGS. 7A and 7B show side views of reservoirs arranged in this way, where in FIG. 7A the belts of alternate conveyors 12 travel in opposite directions and in FIG. 7B the belts of all the conveyors 12 travel in the same direction, as indicated by the arrows on the conveyors 12. The heavy arrows indicate the very slightly serpentine path through the reservoir that is followed by the articles.

It is convenient that a reservoir according to the present invention be provided with components for delivering the articles to the input of the reservoir, and for collecting the articles output from the exit of the reservoir. Typically, these may be arrangements of one or more conveyors, such as flow mass elevators (other arrangements of conveyors or other devices may be used instead, however).

Figure 8:
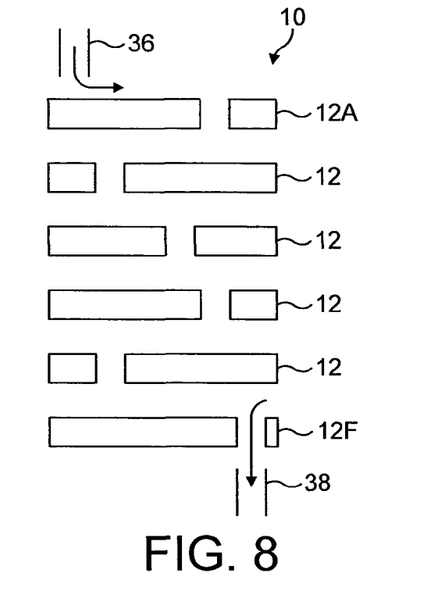
FIG. 8 shows a simplified side view of a reservoir having a delivery conveyor and a collection conveyor according to one embodiment of the invention.

FIG. 8 shows a side view of a reservoir 10 provided with a delivery conveyor 36 arranged to deposit articles supplied by an upstream machine onto the uppermost conveyor 12A in a stack of six conveyors 12. The articles travel down through the reservoir 10 in the manner already described until they fall through the gap in the bottom conveyor 12F, where they are collected by a collection conveyor 38 to be passed to a downstream machine. If the top conveyor 12A and the bottom conveyor 12F are rotatable about the vertical axis of the conveyor stack, it may necessary to reposition the delivery conveyor 36 and the collection conveyor 38 circumferentially with respect to the conveyors to maintain the appropriate positioning between the conveyors. This may be avoidable by appropriate construction of the delivery and collection conveyors however. For example, a hopper may be positioned under the bottom conveyor that can collect articles falling through the gap in the bottom conveyor regardless of its position and funnel the articles into the collection conveyor 38. Alternatively, the collection conveyor may comprise a circular conveyor without a gap but having an outward leading branch and arranged under the bottom conveyor 12F. As a further alternative, to avoid the difficulties of maintaining a suitable coupling between the reservoir and the delivery and collection conveyors, the top conveyor 12A and the bottom conveyor 12F may be static, in that they are not rotatable about the central axis of the stack. This will not impact significantly on the range over which the capacity of the reservoir may be varied, particularly if the stack comprises a large number of conveyors.

To further increase the range of the reservoir capacity over that offered by rotating the conveyors and varying the travel direction of the belts, one or both of the delivery conveyor and the collection conveyor may be arranged to be vertically repositionable with respect to the stack so that the conveyors with which they communicate can be altered. By changing the conveyor on which the articles are delivered into the reservoir and/or the conveyor from which the articles are collected from the reservoir, the total available length of conveyor between the input and exit of the reservoir can be altered.

Figure 9:
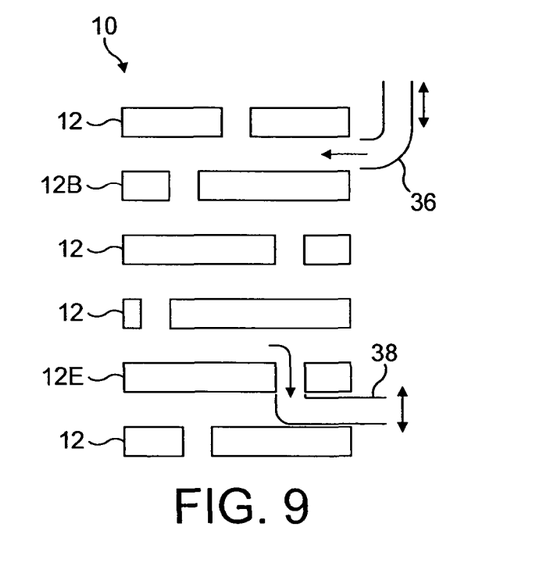
FIG. 9 shows a simplified side view of a reservoir having a delivery conveyor and a collection conveyor according to a further embodiment of the invention.

FIG. 9 shows a side view of a reservoir 10 having a delivery conveyor 36 and a collection conveyor 38 that can be adjusted in this way (indicated by the double-ended arrows). In this example, both are vertically movable, and are currently positioned to deliver articles to the second conveyor 12B and collect articles from the penultimate conveyor 12E. Movement of the delivery and collection conveyors 36, 38 could be controlled by a control unit integrated with other parts of the production line, such as that described with respect to FIG. 6, so that the reservoir capacity can be automatically adjusted in response to changes in production volume.

According to other embodiments of the invention, a reservoir may be provided with one or more rejection units operable to remove articles from one or more of the conveyors. These can be used to remove inferior articles from the product flow during passage of the articles through the reservoir, without the need to run the inferior articles through the output of the reservoir for removal. One or more conveyors can be provided with an associated rejection device arranged to remove articles from that conveyor. When one or a group of inferior articles are detected, the rejection device can be operated as those articles are being conveyed past the rejection device. Depending on the type of rejection device used, it may be necessary to stop the conveyor when the articles in question are aligned with the rejection device. Alternatively, a rejection device that can operate on a moving flow of articles may be employed so that the conveyor need not be stopped; this is more efficient.

Any type of rejection device can be used, such as a mechanical device that pushes or pulls articles off the conveyor, or a suction or fan device that can move the articles by the flow of air. Depending on the direction of movement of the articles produced by the rejection device, and the position of any receptacle arranged to collect the removed articles, the rejection device can be positioned inside or outside the stack.

Figure 10:
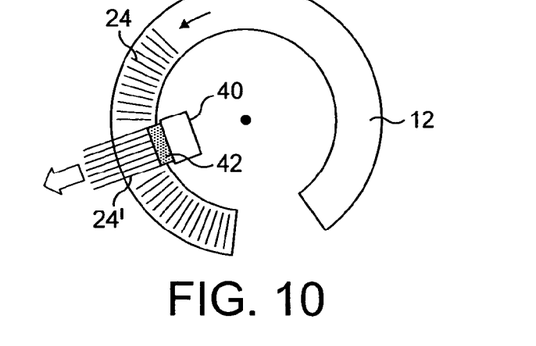
FIGS. 10, 11 and 12 show plan views of curved conveyors provided with rejection devices according to three embodiments of the invention.

FIG. 10 shows a plan view of a conveyor 12 having a first example of a rejection device 40 that is located inside the stack. The rejection device 40 is a mechanical device having a movable piston 42 that can extend across the conveyor 12 into the path of the articles 24 to push a group of rejected articles 24' outwardly off the conveyor 12.

Figure 11:
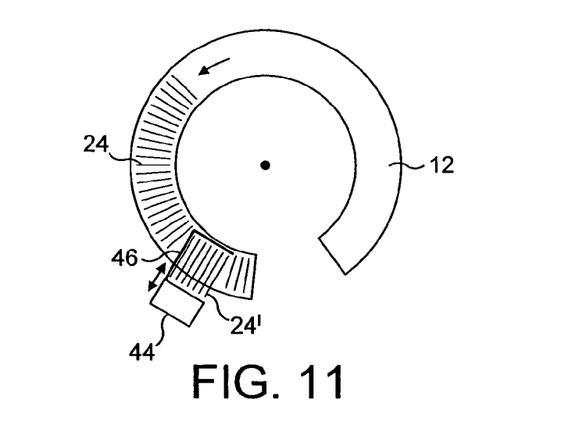

FIG. 11 shows a plan view of a conveyor 12 having a second example of a rejection device 44 that is located outside the stack. The rejection device 44 is again mechanical, but in this example is provided with a scoop 46 on an arm that reaches into the path of the articles 24 to collect a group of rejected articles 24' and pull them outwardly off the conveyor 12.

Figure 12:
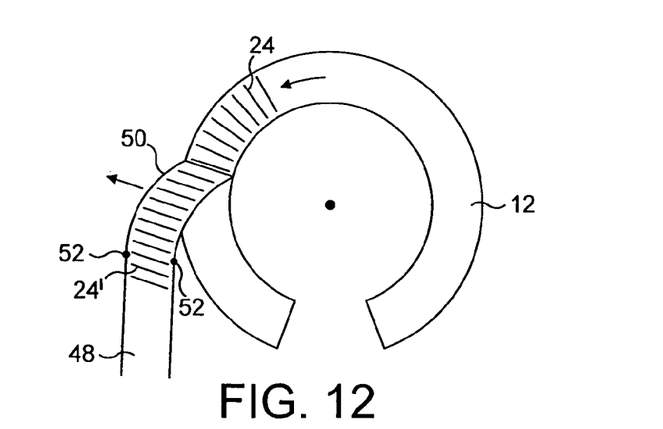

FIG. 12 shows a plan view of a conveyor 12 having a third example of a rejection device. In this embodiment, the rejection device comprises a rejection chute 48 arranged next to the conveyor, which has a hinged portion 50 at one end attached to the main part of the chute by one or more pivots 52. The hinged portion 50 can swing sideways (indicated by the arrow) between an inactive position (not shown), in which it lies next to the conveyor 12, and a pick-up position, in which it sits substantially on the conveyor 12 and hence picks up rejected articles 24' being carried by the belt of the conveyor 12, and diverts them onto the rejection chute 48. Any suitable mechanism can be used to drive the hinged portion 50 (and also the moving parts of the other rejection devices), such as pneumatic or hydraulic pistons, or motors.

Although the invention has been described with regard to rod-like articles related to the tobacco industry, such as cigarettes or other smoking articles, filter units or tobacco rods, it is equally applicable to other small, particularly rod-like, production units which may need to be accommodated in a buffer storage region during production.

REFERENCES

[1] EP 1,344,463 (Molins Plc)
[2] EP 1,445,218 (Hauni Maschinenbau AG)
[3] WO 02/085144 (GD SpA)
[4] WO 2004/085293 (Flexlink Components AB)
[5] US 2003/0000811 (Biondi et al)

The invention claimed is:

1. An adjustable reservoir for rod-like articles comprising:
at least two conveyors mounted one above another in a vertical stack, each conveyor comprising an endless belt defining a substantially horizontal curved conveying path of substantially constant radius extending between two ends proximally spaced to define a gap through which articles carried by the belt may drop, the radius of each conveyor being substantially equal; and a drive mechanism operable to rotate at least one conveyor about the vertical axis of the stack so as to change the angular position of the gap of that conveyor relative to the gaps of adjacent conveyors.

2. An adjustable reservoir according to claim 1, wherein the drive mechanism comprises a single driver unit connected to alternate conveyors in the stack and operable to rotate those conveyors in unison.

3. An adjustable reservoir according to claim 1, wherein the drive mechanism comprises a first driver unit connected to alternate conveyors in the stack and operable to rotate those conveyors in unison, and a second driver unit connected to the remaining conveyors in the stack and operable to rotate those conveyors in unison.

4. An adjustable reservoir according to claim 3, wherein the first driver unit is operable to rotate its conveyors in a first direction, and the second driver unit is operable to rotate its conveyors in a second direction opposite to the first direction.

5. An adjustable reservoir according to claim 1, wherein the drive mechanism comprises a driver unit for each conveyor, each driver unit connected to its conveyor and operable to rotate that conveyor independently of the other conveyors in the stack.

6. An adjustable reservoir according to claim 5, wherein the driver units are operable to rotate alternate conveyors in the stack in opposite directions.

7. An adjustable reservoir according to claim 1, wherein the belts of alternate conveyors in the stack travel in opposite directions.

8. An adjustable reservoir according to claim 1, wherein the belts of all the conveyors in the stack travel in the same direction.

9. An adjustable reservoir according to claim 1, wherein the direction of travel of the belt of each conveyor can be switched between two opposite directions.

10. An adjustable reservoir according to claim 1, wherein the belt of at least one conveyor may be kept static while the belts of the other conveyors are travelling.

11. An adjustable reservoir according to claim 1, further comprising at least one rejection device operable to remove defective articles from at least one conveyor.

12. An adjustable reservoir according to claim 1, further comprising a delivery conveyor arranged to deliver articles onto a conveyor in the stack, and a collection conveyor arranged to collect articles from a conveyor lower in the stack than the said conveyor.

13. An adjustable reservoir according to claim 12, wherein the delivery conveyor delivers articles to the top conveyor, and the collection conveyor collects articles from the bottom conveyor.

14. An adjustable reservoir according to claim 13, wherein the top conveyor and the bottom conveyor are not rotatable about the vertical axis of the stack.

15. An adjustable reservoir according to claim 12, wherein at least one of the delivery conveyor and the collection conveyor is vertically repositionable to communicate with different conveyors, whereby the number of conveyors between the delivery conveyor and the collection conveyor may be varied.

16. An adjustable reservoir providing a buffer storage region for rod-like articles, comprising:

at least two conveyors mounted one above another in a vertical stack, each conveyor comprising an endless belt defining a substantially horizontal curved conveying path of substantially constant radius extending between two ends proximally spaced to define a gap through which articles carried by the belt may drop, the radius of each conveyor being substantially equal;

a drive mechanism operable to rotate at least one conveyor about the vertical axis of the stack so as to change the angular position of the gap of that conveyor relative to the gaps of adjacent conveyors;

a delivery conveyor arranged to deliver articles onto a top conveyor in the stack; and a collection conveyor arranged to collect articles from a bottom conveyor, the bottom conveyer lower in the stack than the top conveyor;

wherein at least one of the delivery conveyor and the collection conveyor is vertically repositionable to communicate with different conveyors, whereby the number of conveyors between the delivery conveyor and the collection conveyor may be varied.

17. An adjustable reservoir according to claim 16, further comprising:

at least one rejection device operable to remove defective articles from at least one conveyor.

* * * * *

UNITED STATES PATENT AND TRADEMARK OFFICE
CERTIFICATE OF CORRECTION

PATENT NO. : 8,443,964 B2
APPLICATION NO. : 12/521708
DATED : May 21, 2013
INVENTOR(S) : Gary Fallon Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this
Eighth Day of September, 2015

Michelle K. Lee
*Director of the United States Patent and Trademark Office*